(12) United States Patent
Schmitz et al.

(10) Patent No.: US 8,018,410 B2
(45) Date of Patent: *Sep. 13, 2011

(54) FLEXIBLE AND TRANSPARENT GROUND PLANE FOR ELECTRIC PAPER

(75) Inventors: Gregory P. Schmitz, Los Gatos, CA (US); Michael B. Heaney, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1386 days.

This patent is subject to a terminal disclaimer.

(21) Appl. No.: 10/739,839

(22) Filed: Dec. 18, 2003

(65) Prior Publication Data
US 2005/0134553 A1 Jun. 23, 2005

(51) Int. Cl.
*G09G 3/34* (2006.01)
*G09G 3/36* (2006.01)
*G02B 26/00* (2006.01)

(52) U.S. Cl. ............ 345/84; 345/86; 345/107; 359/296
(58) Field of Classification Search ............ 345/84–111; 359/85, 86, 48, 105, 107–109, 296
See application file for complete search history.

(56) References Cited

U.S. PATENT DOCUMENTS

| | | |
|---|---|---|
| 4,126,854 A | 11/1978 | Sheridon |
| 5,389,945 A | 2/1995 | Sheridon |
| 5,723,204 A | 3/1998 | Stefik |
| 6,222,513 B1 | 4/2001 | Howard et al. |
| 6,235,395 B1 | 5/2001 | Sacripante et al. |
| 7,139,114 B2 * | 11/2006 | Schmitz et al. ............ 359/296 |
| 7,663,582 B2 * | 2/2010 | Schmitz et al. ............ 345/84 |
| 2002/0099114 A1 | 7/2002 | Nakayoshi et al. |
| 2002/0102385 A1 | 8/2002 | Kuhl et al. |

* cited by examiner

*Primary Examiner* — Srilakshmi K Kumar
(74) *Attorney, Agent, or Firm* — Fay Sharpe LLP

(57) ABSTRACT

An improved electric paper structure is provided. A ground plane assembly having discontinuous grounding elements is used to render electric paper applications more flexible.

21 Claims, 6 Drawing Sheets

FLEXIBLE AND TRANSPARENT GROUND PLANE FOR ELECTRIC PAPER

BACKGROUND

The present exemplary embodiment relates to the use of electronic display materials for electric paper applications. It finds particular application in rendering electric paper applications more flexible by providing a discontinuous and transparent ground plane, and will be described with particular reference thereto. However, it is to be appreciated that the present exemplary embodiment is also amenable to other like applications.

By way of background, electric paper can be defined as any electronically-addressable display medium that approximates paper in form and function. To be most versatile, electric paper should be light-weight, thin and flexible, and it should display images indefinitely while consuming little or no power. In addition, electric paper should be reusable. One must be able to erase images and create new ones repeatedly. Preferably, electric paper should display images using reflected light and allow a very wide viewing angle.

One way to make electric paper possible using traditional electronic display technology is to completely remove the driving electronics from an electronic display package and use external addressing electrodes to write and erase images. This approach both reduces the per unit cost of electronic paper sheets and enables the use of cheap, flexible plastic films in place of glass plates for packaging. Multiple electronic paper sheets can then be addressed by a single set of external driving electronics, much like multiple sheets of pulp paper are printed on by a single printer.

A known sheet and display system, dubbed Gyricon, is disclosed in various patents and articles, such as U.S. Pat. No. 4,126,854 by Sheridon titled "Twisting Ball Display." The Gyricon display system is comprised of an elastomeric host layer of approximately 300 micrometers thick which is heavily loaded with rotating elements, possibly spheres, tens of micrometers (e.g. 100 micrometers) in diameter. Each rotating element has halves of contrasting colors, such as a white half and a black half. Each bichromal rotating element also possesses an electric dipole, nominally orthogonal to the plane that divides the two colored halves. Each bichromal rotating element is contained in its own cavity filled with a dielectric liquid. Upon application of an electric field between electrodes located on opposite surfaces of the host layer, the rotating elements will rotate depending on the polarity of the field, presenting one or the other colored half to an observer.

A Gyricon sheet has many of the requisite characteristics of electric paper, namely, bistable image retention, wide viewing angle, thin and flexible packaging, and high reflectance and resolution. U.S. Pat. No. 5,389,945 issued to Sheridon on Feb. 14, 1995, and titled "Writing System Including Paper-Like Digitally Addressed Media and Addressing Device Therefor," describes an electric paper printing system that employs independent, external addressing means to put images on the Gyricon sheets. The external addressing means is described as a one-dimensional array of electrodes connected, either directly or by wireless technology, to modulating electronics. As the one-dimensional array is scanned across the sheet, modulating electronics adjust the potential at the individual electrodes, creating electric fields between the electrodes and an equipotential surface. An image is created in the sheet according to the polarity of the electric fields.

FIG. 1 shows a representation of a Gyricon sheet comprised of a plurality of bichromal rotating elements cast in a retaining medium 200. It is contained between a first encapsulating layer, or image plane, 202 and a second encapsulating layer 204. The sheet 200 and encapsulating layers 202, 204 are placed in proximity to a supporting back plane, or ground plane, 206 that is electrically grounded. An external addressing device 208 connected to a power supply 210 is depicted moving across the sheet in a direction D. Each bichromal sphere 220, 226, 232 is contained in its own liquid-filled cavity 221, 227, 233 within the retaining medium 200. An electric field exists directly between the external addressing device 208 and the equipotential surface 206 that causes the local bichromal sphere 226 to rotate.

To improve performance, more recent embodiments of these sheets advantageously incorporate charge-retaining islands thereon. U.S. Pat. No. 6,222,513 B1, issued Apr. 24, 2001 and entitled "Charge Retention Islands for Electric Paper and Applications Thereof" describes electric paper having these features. Turning now to FIG. 2, an exemplary Gyricon sheet of this type is shown. The gyricon sheet is comprised of the following elements: A sheet 300, a first encapsulating layer, or image plane, 302 patterned with conductive charge-retaining islands 306, and a second encapsulating layer 304 that may or may not be patterned with charge-retaining islands.

Together, the first encapsulating layer 302 and the second encapsulating layer 304 do the following things: indefinitely contain a sheet 300, provide at least one transparent window through which the sheet 300 can be viewed, provide at least one external surface patterned with charge retaining islands 306 that can be addressed with an external charge transfer device. The first encapsulating layer 302 and second encapsulating layer 304 could take the form of thin plastic sheets that are sealed or fastened around the perimeter of the sheet 300. The second encapsulating layer 304 need not be entirely separate from the first encapsulating layer 302. The second encapsulating layer 304 could simply be an extension of the first encapsulating layer 302, folded over and around the edge of the sheet and then sealed or fastened around the remaining perimeter. The first encapsulating layer 302 and second encapsulating layer 304 could also take the form of a coating, applied by spraying, doctoring, or some other method to hold the contents of the sheet 300. The ground plane is not specifically shown in full, although the second encapsulating layer 304 could be implemented as the entire ground plane or a portion of a ground plane.

FIG. 2 also shows a pattern for the charge retaining islands 306 of the outer surface of the first encapsulating layer 302. Charge-retaining islands 306 have square perimeters and are organized in a regular two-dimensional array. Narrow channels 303 of insulating material separate the charge-retaining islands 306. The channels 303 serve to isolate the charge-retaining islands 306, preventing migration of charge laterally across the encapsulating sheet, and should be small with respect to the charge-retaining islands 306, so that the maximum possible area of the display is covered with conductive charge-retaining material.

FIG. 3 simply illustrates a second possible embodiment of a charge-retaining island pattern that utilizes a random array. The top view of the first encapsulating layer 400 shows randomly shaped and oriented charge retaining islands 404 separated by channels 402. Charge retaining islands 404 must still be relatively large compared to the channels 402, but in such a random distribution, both feature sizes must be much smaller than the pixel size of a displayed image.

However, the current embodiment of electric paper does not provide as much flexibility as is desired to make electric paper act and react more like actual paper. It cannot be rolled in ways resembling actual paper. For example, the ground plane 206 is typically rigid—which effectively renders the entire structure rigid.

This deficiency is not insignificant, particularly given that contemplated uses of electric paper may require sufficient flexibility to facilitate rolling. Therefore, an electric paper embodiment having mechanical flexibility would help achieve the objective of rendering electric paper more flexible.

BRIEF DESCRIPTION

In accordance with one aspect of the present exemplary embodiment, an electric paper apparatus comprises a media plane having a first side and a second side, the media plane having embedded therein display elements that are reactive to electric charge, an image plane disposed on a first side of the media plane having charge retention devices formed thereon or embedded therein to selectively provide electric charge to the display elements of the media plane and a discontinuous ground plane disposed on the second side of the media plane having discontinuous grounding elements positioned therein.

In accordance with another aspect of the present exemplary embodiments, the grounding elements are bars.

In accordance with another aspect of the present exemplary embodiments, the bars are formed of indium tin oxide (ITO).

In accordance with another aspect of the present exemplary embodiments, the ground plane assembly further comprises a flexible base plane.

In accordance with another aspect of the present exemplary embodiments, the flexible base plane is transparent.

In accordance with another aspect of the present exemplary embodiments, the ground plane assembly is operative to engage a grounded conductive wiper during a printing process.

In accordance with another aspect of the present exemplary embodiments, the ground plane assembly is transparent.

In accordance with another aspect of the present exemplary embodiments, the display elements comprise microencapsulated bichromal spheres, electrophoretic particles, or liquid crystal droplets.

In accordance with another aspect of the present exemplary embodiments, the image plane comprises plastic material having the charge retention devices formed thereon.

In accordance with another aspect of the present exemplary embodiments, an electric paper apparatus comprises a media plane having a first side and a second side, the media plane having embedded therein display elements that are reactive to electric fields, an image plane disposed on a first side of the media plane having charge retention devices formed thereon or embedded therein to selectively hold electric charge near the display elements of the media plane and a ground plane assembly disposed on the second side of the media plane, the ground plane assembly having discontinuous grounding elements disposed on a base layer adjacent the second side of the media plane.

In accordance with another aspect of the present exemplary embodiments, the grounding elements are bars.

In accordance with another aspect of the present exemplary embodiments, the bars are formed of transparent conductive material such as indium tin oxide (ITO).

In accordance with another aspect of the present exemplary embodiments, the base plane is transparent.

In accordance with another aspect of the present exemplary embodiments, the ground plane assembly is operative to engage a grounded conductive wiper during a printing process.

In accordance with another aspect of the present exemplary embodiments, the ground plane assembly is transparent.

In accordance with another aspect of the present exemplary embodiments, an electric paper apparatus comprises a media plane having a first side and a second side, the media plane having embedded therein display elements that are reactive to electric charge, an image plane disposed on a first side of the media plane having charge retention devices formed thereon or embedded therein to selectively provide electric charge to the display elements of the media plane and a ground plane assembly disposed on the second side of the media plane, the ground plane assembly having discontinuous grounding elements separated by spacers adjacent the second side of the media plane.

In accordance with another aspect of the present exemplary embodiments, the ground plane assembly further comprises a flexible base plane onto which the grounding elements are disposed.

In accordance with another aspect of the present exemplary embodiments, the grounding elements are bars.

In accordance with another aspect of the present exemplary embodiments, the bars are formed of conductive material such as indium tin oxide (ITO).

In accordance with another aspect of the present exemplary embodiments, the base plane is transparent.

In accordance with another aspect of the present exemplary embodiments, the ground plane assembly is transparent.

DETAILED DESCRIPTION

A potential advantage of electric paper is mechanical flexibility. Many possible implementations of electric paper involve rolling the electric paper into a cylindrical shape and printing as it is unrolled. However, this type of deformation would easily crack the continuous conductive film currently used as a ground plane. Further, relatively high voltages are required by some electric paper media. To overcome these deficiencies, the presently proposed embodiments use a discontinuous and transparent conductive film (such as indium tin oxide (ITO) film) as the ground plane.

In one form, the discontinuous ground plane is implemented together with a grounded conductive wiper that touches this discontinuous ground plane on the side of the electric paper structure opposite the printhead. The conductive wiper ensures that the discontinuous ground plane regions are all at ground as the printhead is depositing charge on the top surface of the electric paper to form the image.

In another form, the discontinuous ground plane is located between the electric paper medium and a non-conductive flexible base plane. It is implemented together with a grounded conductive wiper that touches this ground plane on the side of the electric paper structure that is near or far from the printhead, at conductive feedthroughs. The conductive wiper ensures that the discontinuous ground plane islands or bars are all at ground as the printhead is depositing charge on the top surface of the electric paper to form the image. This form eliminates any voltage drop across the flexible base plane, allowing the electric paper media to work at an effective lower applied voltage. As such, the printhead and the ground plane head can be on the same side of the electric paper, possibly simplifying the overall geometry and allowing for a smaller printing device.

Use of either of the above embodiments gives the ground plane, and thus the entire structure, the flexibility to be rolled into a cylindrical shape without damage. It also allows the "viewing" side to be the ground "plane" side, since the discontinuous film is transparent.

Figure 4:
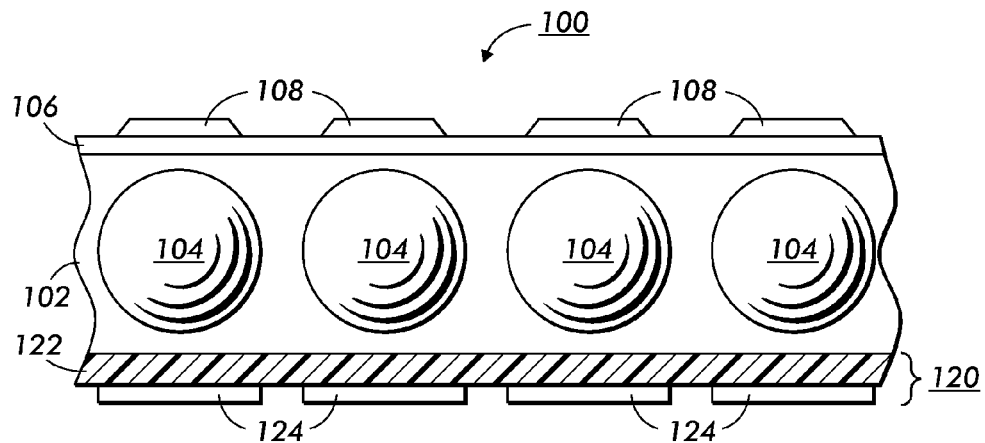
FIG. 4 is a cross-sectional view of a portion of an electric paper structure according to the presently described embodiments.

With reference to FIG. 4, an electric paper structure incorporating the discontinuous ground plane as described above is illustrated. As shown, a sheet of electric paper 100 includes a media plane 102 having display elements 104 disposed therein. The electric paper 100 is also provided with an image plane 106 having charge retention devices, or islands, 108 formed thereon. Notably, the electric paper 100 includes a ground plane assembly 120 formed by a base layer 122 and a plurality of grounding bars 124.

These layers of material may be formed together using any of a variety of known techniques. For example, the layers may simply be adhered to one another using techniques that are consistent with the materials used and the environment of fabrication and implementation.

It should be understood that the media plane 102 may be formed from a variety of elements that are known in the art. In one form, the media plane 102 comprises an elastomeric material having microencapsulated bichromal spheres embedded therein. Of course, the microencapsulated bichromal spheres serve as the display elements 104. As an alternative, liquid crystal droplets or electrophoretic particles may be used in place of microencapsulated spheres.

Likewise, the image plane may take a variety of forms that are known in the field. As shown, the image plane 106 is a plastic layer having charge retention islands 108 formed thereon using photolithographic and other techniques. However, it should be appreciated that the image plane may also take other forms such as a disordered percolation layer, as described in co-pending, commonly assigned U.S. Patent Application (U.S. Ser. No. 10/739,809) entitled "Disordered Percolation Layer for Forming Conductive Islands on Electric Paper," filed Dec. 18, 2003, bearing and naming Schmitz and Heaney as inventors (which is incorporated herein by reference), or an elastomeric layer (having islands formed thereon or embedded therein), as described in co-pending, commonly assigned U.S. patent application having Ser. No. 10/739,614, filed Dec. 18, 2003, entitled "Flexible Electric Paper Display Apparatus," and naming Schmitz, Heaney and Shrader as inventors (which is incorporated herein by reference).

Figure 1:
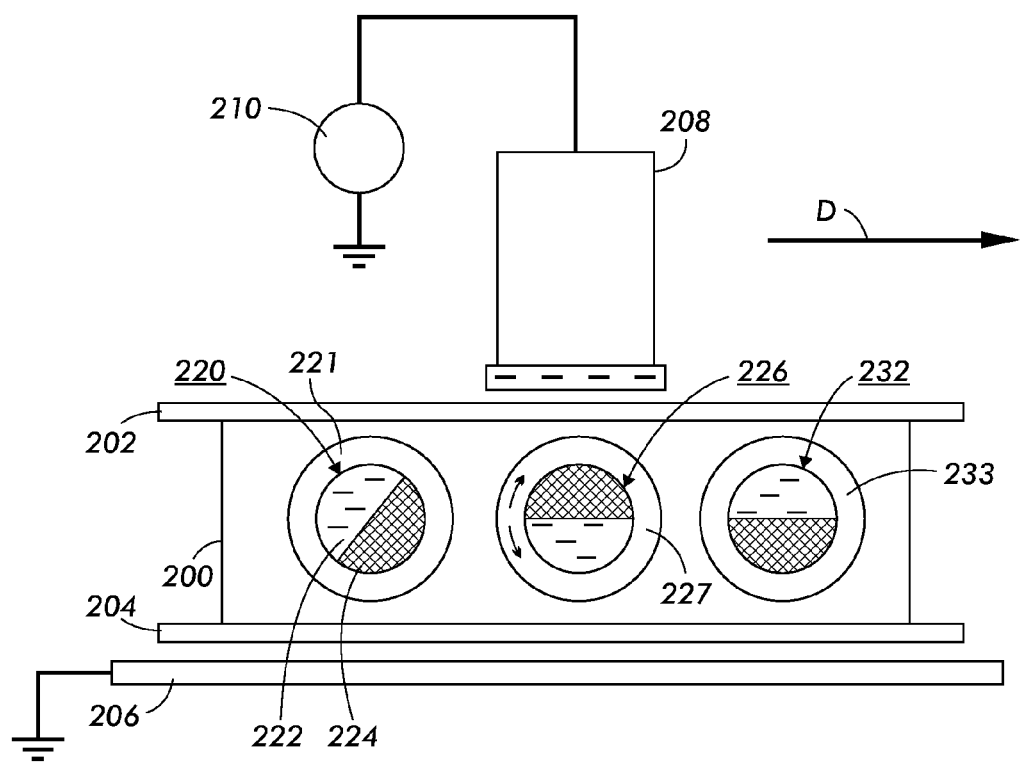
FIG. 1 is a cross-sectional view of a portion of a prior art electric paper configuration.
Figure 2:
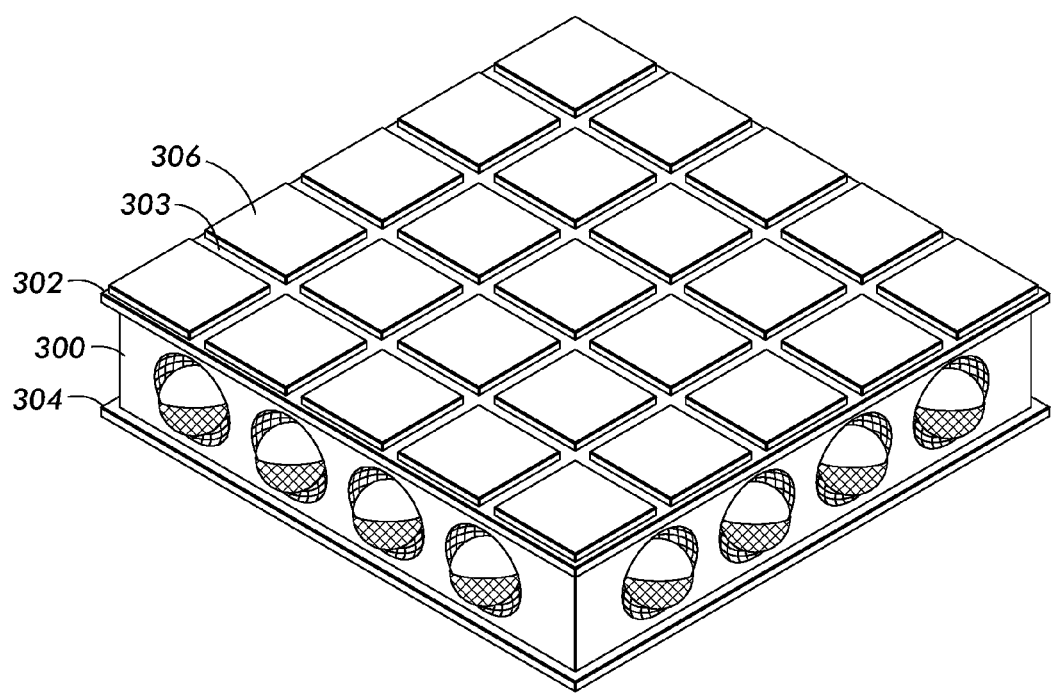
FIG. 2 is a perspective view of a prior art electric paper configuration.
Figure 3:
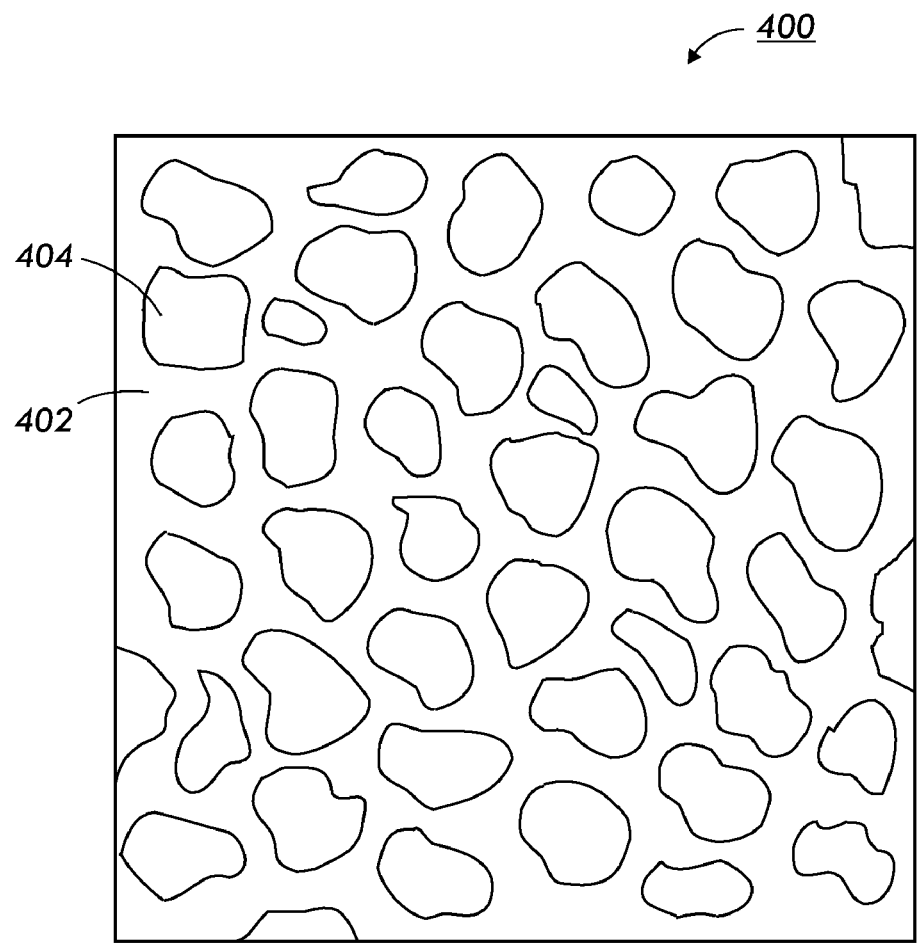
FIG. 3 is a top view of a prior art electric paper configuration.

For the presently described embodiment, it is the discontinuous ground plane assembly 124 that provides increased flexibility to allow the electric paper to actually be rolled, similar to actual paper. The ground plane assembly 120 formed from the plastic layer 122 and the grounding bars 124, allows for flexibility of the electric paper without cracking the ground plane, as would occur if the electric paper structures shown in FIGS. 1-3 were flexed to any great degree. The plastic layer 122 is preferably formed of a transparent material such as Mylar material. Notably, the grounding bars could be formed from indium tin oxide (ITO) material. The bars may be formed on the plastic layer using any of a variety of techniques that are well known to those in the fabrication field. For example, the bars may be formed on the plastic using photolithographic techniques, similar to those used to form the charge retention islands 306 of FIG. 2. Simple laminating or embedding techniques may also be used.

As shown, the bars are positioned to be laterally continuous (across the width of the electric paper structure) but discontinuous in the processing direction. This will become more apparent from review of FIG. 5.

It should be appreciated that a variety of different geometric shapes could be used to implement discontinuous grounding plane of this embodiment. The use of bars is merely an example. However, in selecting a shape and configuration of individual grounding elements (e.g. bars) or the ground plane overall, the electrical and physical limitations of the material used should be taken into account. For example, the grounding elements are preferably sized to be small relative to the bend radius of the electric paper structure but, at the same time, may be sized to be large relative to the width of the electric paper structure (to achieve strong electrical properties). As a further example, it may be desired to place a sufficient number of grounding elements in the ground plane to account for those that may become inoperative as a result of, for example, unanticipated cracking.

Moreover, transparency is not a requirement. A discontinuous ground plane may be implemented without transparency, provided that the system into which it is implemented does not contemplate the use of the ground plane as the viewing side.

Figure 5A:
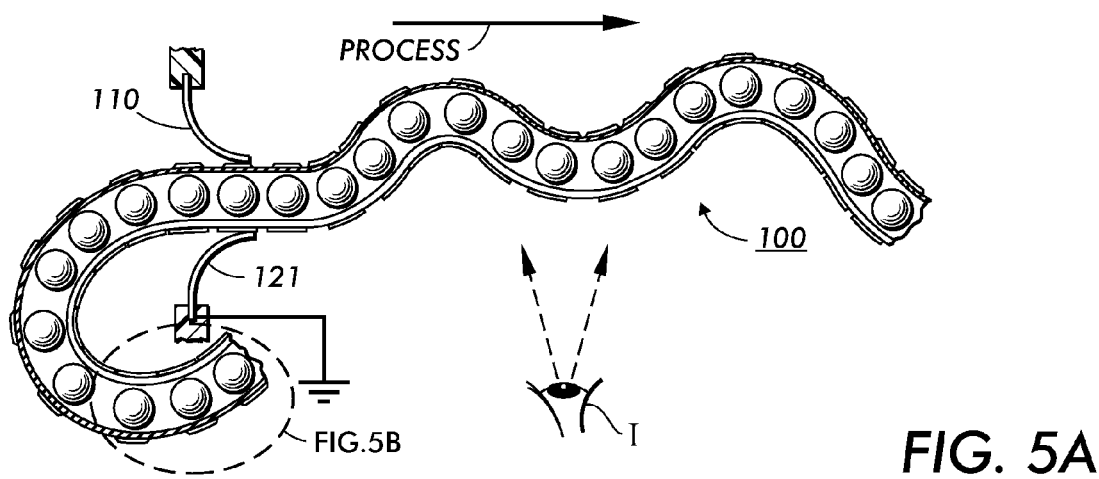
FIG. 5(a) is an illustration representing a portion of an electric paper structure according to the presently described embodiments.
Figure 5B:
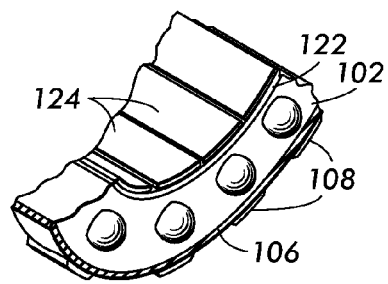
FIG. 5(b) is an illustration of the circled area V-B of FIG. 5(a)

Referring now to FIG. 5(a), the electric paper structure 100 is illustrated in a flexed position and in the presence of a printhead, representatively shown. As shown, printhead 110 engages the image plane of the electric paper for printing purposes. In this embodiment, the ground wiper 121 is also provided to ensure that the ground plane bars opposite the printhead are at ground as the printhead is depositing charge on the top surface of the electric paper to form the image. More particularly shown in FIG. 5(b) are the grounding bars 124 disposed on the plastic layer 122 to form the ground assembly 120. Notably, the bars 124 are positioned to be laterally continuous (across the width of the electric paper structure) but discontinuous in the processing direction.

Figure 6:
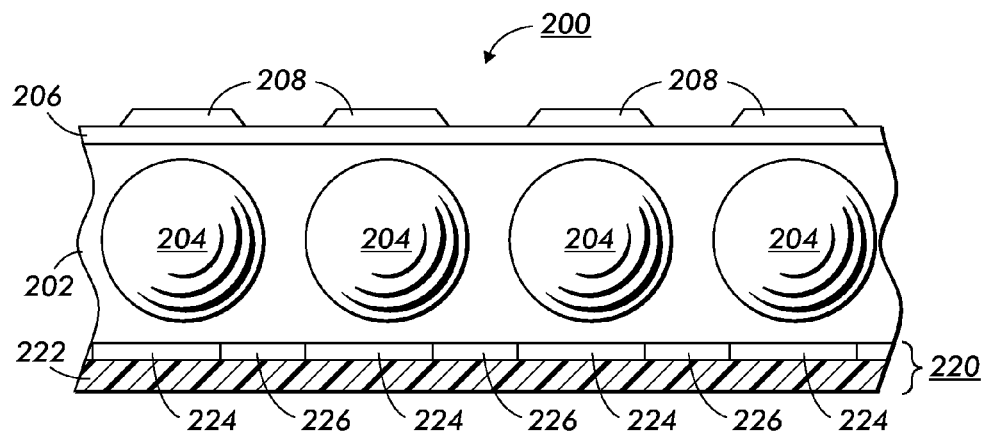
FIG. 6 is an illustration representing a portion of an electric paper structure according to the presently described embodiments.

Referring now to FIG. 6, another embodiment of an electric paper structure is illustrated. As shown, electric paper structure 200 includes a media plane 202 having display elements 204 disposed therein. Also shown is an image plane 206 having charge retention devices, or islands, 208, formed thereon. Of note is the ground plane assembly 220, which is formed by plastic layer 222 having formed thereon discontinuous ground bars 224 and conductive elastomer pads 226.

These layers of material may be formed together using any of a variety of known techniques. For example, the layers may simply be adhered to one another using techniques that are consistent with the materials used and the environment of fabrication and implementation.

Like the embodiment shown in FIG. 4, the media plane 202 and the image plane 206 may take a variety of forms such as those described above and others.

The ground plane assembly 220 is preferably formed of a thin plastic, transparent base layer 222 having embedded or formed thereon the discontinuous ground bars 224 that are continuous in a lateral direction and discontinuous in the process direction. The layer 222 may also be implemented using elastomeric material. Preferably, the layer 222 is formed of transparent material. The bars 224, and the pads 226, may be formed on the layer 222 using any of a variety of techniques that are well known to those in the fabrication field. For example, the bars may be formed on the plastic using photolithographic techniques, similar to those used to form the charge retention islands 306 of FIG. 2. Simple laminating or embedding techniques may also be used.

Like the previous embodiment, it should be appreciated that a variety of different geometric shapes could be used to implement discontinuous grounding plane of this embodiment. The use of bars is merely an example. However, in selecting a shape and configuration of individual grounding elements (e.g. bars) or the ground plane overall, the electrical and physical limitations of the material used should be taken into account. For example, the grounding elements are preferably sized to be small relative to the bend radius of the electric paper structure but, at the same time, may be sized to be large relative to the width of the electric paper structure (to achieve strong electrical properties).

Moreover, transparency is not a requirement. A discontinuous ground plane may be implemented without transparency, provided that the system into which it is implemented does not contemplate the use of the ground plane as the viewing side.

The conductive elastomer pads 226 may extend laterally as the ITO ground bars; however, this is not necessary. The pads may simply be short bars that provide for spacing and do not laterally extend the width of the electric paper. Of course, any geometric shape for the elastomer pads will suffice, provided that the pad used facilitates the desired spacing. In addition, the elastomer pads serve to provide a grounding connection between all of the bars in the ground plane.

Figure 7A:
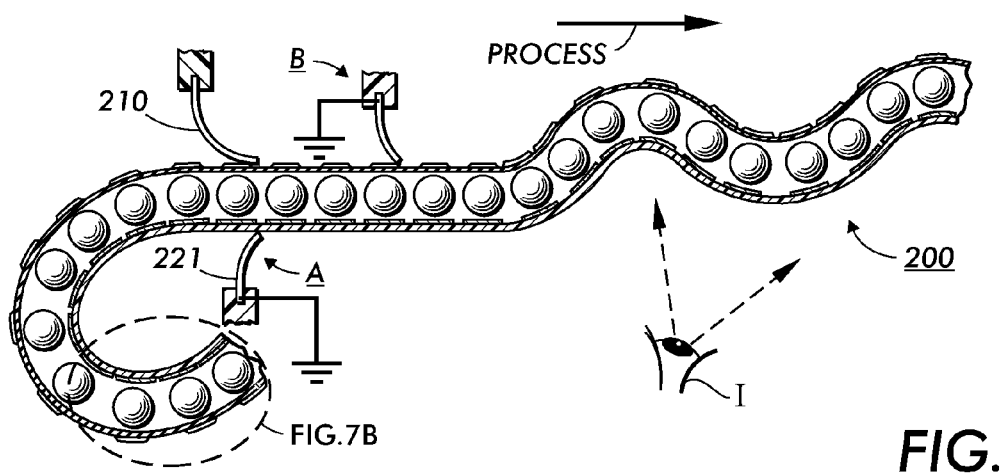
FIG. 7(a) is an illustration representing a portion of an electric paper structure according to the presently described embodiments.
Figure 7B:
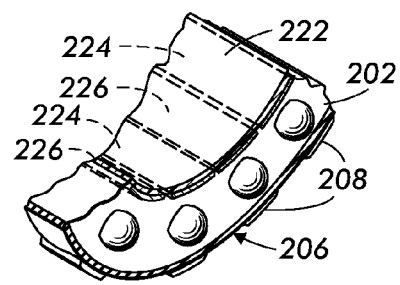
FIG. 7(b) is an illustration of the circled area VII-B of FIG. 7(a)

Referring now to FIG. 7(*a*), electric paper structure 200 is illustrated as being in contact with printhead 210. Also shown in FIG. 7(*b*) is a perspective view of electric paper structure 200 including the discontinuous ground bars 224 embedded between plastic layer 222 and the media plane 202. It should be noted that in this embodiment, the ground wiper 221 could be provided on either side of the electric paper as shown, for example, at positions A or B (FIG. 7 (*a*)). Of course, fundamentally, the ground wiper is provided to ensure that the ground plane bars opposite the printhead are at ground as the printhead is depositing charge on the top surface of the electric paper to form the image. The reason that this embodiment is conducive to the disposition of the ground wiper 221 on the same side as the print head is that the voltage drop across the layer 222 is not seen with the ground plane adjacent the media plane. In the previous embodiment, the layer 122 is positioned between the grounding bars 124 and the media plane 102.

Figure 8:
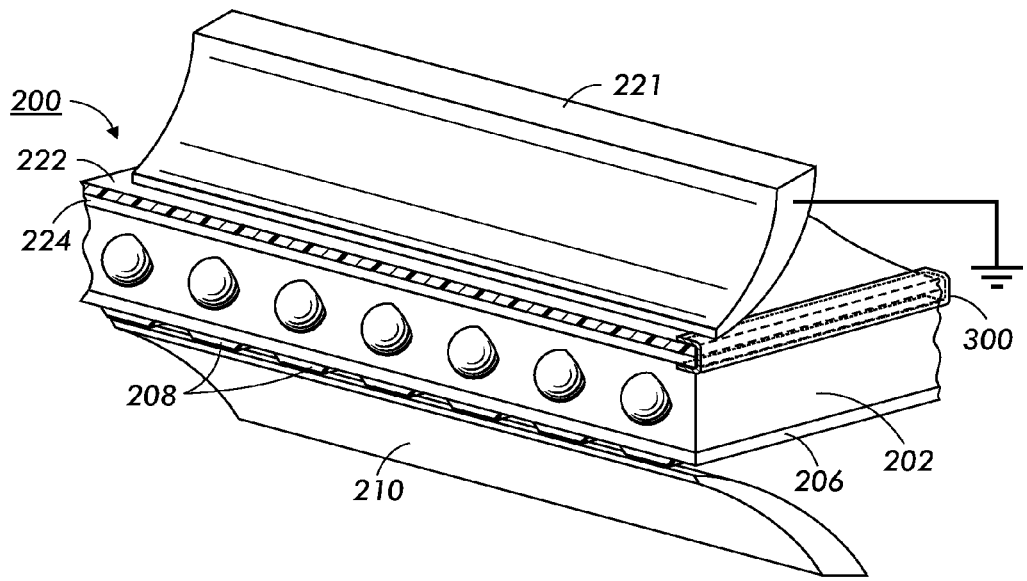
FIG. 8 is an illustration of an implementation of the presently described embodiments; and, FIG. 9 is an illustration of an implementation of the presently described embodiments.
Figure 9:
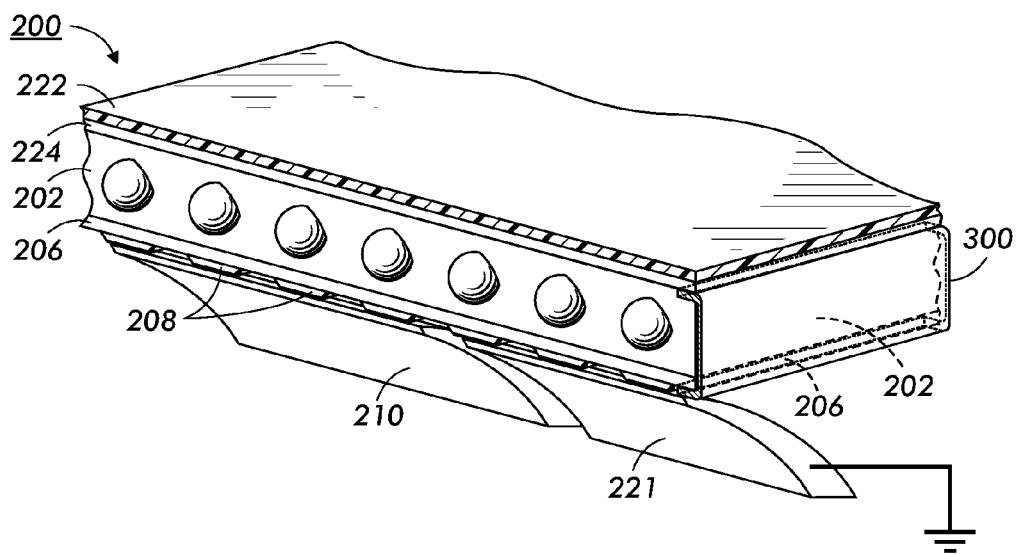

To illustrate, FIGS. 8 and 9 show implementations of the presently described embodiments utilizing a ground wiper 1) on a side of the electric paper structure illustrated in FIG. 6 that is opposite the printhead 210 (FIG. 8), and 2) on the same side as the printhead 210 (FIG. 9). More particularly, referring to FIG. 8, electric paper structure 200 including plastic layer 222, discontinuous ground bars 224, media plane 202, and image plane 206 with islands 208 formed thereon is illustrated. Note that the printhead 210 is shown as being on the image plane side of the structure. Conversely, the ground wiper 220 is shown as being on the ground plane side of the structure. Notably, a grounding line or ribbon 300 is shown as extending from the media plane 202 around the edge of the structure to the ground plane such that the ground wiper can engage the grounding line or ribbon. Of course, it is to be appreciated that the ground wire 300 may be formed from any suitable conductive material and take a variety of forms depending on the actual implementation of the ground wiper. For example, it may be provided as a metal ribbon that merely touches the edge of the electric paper structure. Likewise, depending on the configuration of the ground plane, the ground wiper may remain stationery or be selectively moved throughout the printing process.

Referring now to FIG. 9, electric paper structure 200 is again shown as having plastic layer 222, ground bars 224, media plane 202, and, image plane 206 with islands 208 formed thereon. In FIG. 9, the ground wiper 220 is illustrated as being on the same side of the structure as the printhead 210. In this configuration, the grounding line or ribbon 300 is shown as extending from the media plane 202 to the image plane 206 to engage the ground wiper 220. As above, the grounding wire or ribbon 300 may be formed of any suitable conductive material and take a variety of forms to accommodate the precise configuration of the electric paper structure. Also, the conductive wiper 220 may also take a variety of forms operated in a variety of manners depending on the precise configuration of the structure and the printing process used.

Referring back now to FIGS. 5(*a*) and (*b*) and 7(*a*) and (*b*), it should be appreciated that implementation of the presently described embodiments would allow for the view side of the electric paper to be the ground plane side of the paper. In previous embodiments of electric paper, it was the image plane side of the electric paper that was the view side. The reason for this is that the ground planes of previous electric paper embodiments were opaque and rigid. However, use of the present embodiments allow for transparent discontinuous film to be used as the ground plane, thus allowing for the ground plane side to be the view side of the electric paper structure.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An electric paper apparatus comprising:
    a media plane having a first side and a second side, the media plane having embedded therein display elements that are reactive to electric fields;
    an image plane disposed on a first side of the media plane having charge retention devices formed thereon or embedded therein to selectively hold electric charge near the display elements of the media plane; and,
    a ground plane assembly disposed on the second side of the media plane having discontinuous grounding elements positioned therein, the discontinuous grounding elements being configured to be discontinuous in a first direction to enhance flexibility of the electric paper apparatus and to be continuous in a second direction to achieve desired electrical properties.

2. The apparatus as set forth in claim 1 wherein the grounding elements are bars.

3. The apparatus as set forth in claim 2 wherein the bars are formed of indium tin oxide (ITO).

4. The apparatus as set forth in claim 1 wherein the ground plane assembly further comprises a flexible base plane.

5. The apparatus as set forth in claim 4 wherein the flexible base plane is transparent.

6. The apparatus as set forth in claim 1 wherein the ground plane assembly is operative to engage a grounded conductive wiper during a printing process.

7. The apparatus as set forth in claim 1 wherein the ground plane assembly is transparent.

8. The apparatus as set forth in claim 1 wherein the display elements comprise microencapsulated bichromal spheres.

9. The apparatus as set forth in claim 1 wherein the image plane comprises plastic material having the charge retention devices formed thereon.

10. An electric paper apparatus comprising:
a media plane having a first side and a second side, the media plane having embedded therein display elements that are reactive to electric fields;
an image plane disposed on a first side of the media plane having charge retention devices formed thereon or embedded therein to selectively hold electric charge near the display elements of the media plane; and,
a ground plane assembly disposed on the second side of the media plane, the ground plane assembly having discontinuous grounding elements disposed on a base layer adjacent the second side of the media plane, the discontinuous grounding elements being configured to be discontinuous in a first direction to enhance flexibility of the electric paper apparatus and to be continuous in a second direction to achieve desired electrical properties.

11. The apparatus as set forth in claim 10 wherein the grounding elements are bars.

12. The apparatus as set forth in claim 11 wherein the bars are formed of indium tin oxide (ITO).

13. The apparatus as set forth in claim 10 wherein the base plane is transparent.

14. The apparatus as set forth in claim 10 wherein the ground plane assembly is operative to engage a grounded conductive wiper during a printing process.

15. The apparatus as set forth in claim 10 wherein the ground plane assembly is transparent.

16. An electric paper apparatus comprising:
a media plane having a first side and a second side, the media plane having embedded therein display elements that are reactive to electric fields;
an image plane disposed on a first side of the media plane having charge retention devices formed thereon or embedded therein to selectively hold electric charge near the display elements of the media plane; and,
a ground plane assembly disposed on the second side of the media plane, the ground plane assembly having discontinuous grounding elements separated by spacers adjacent the second side of the media plane, the discontinuous grounding elements being configured to be discontinuous in a first direction to enhance flexibility of the electric paper apparatus and to be continuous in a second direction to achieve desired electrical properties.

17. The apparatus as set forth in claim 16 wherein the ground plane assembly further comprises a flexible base plane onto which the grounding elements are disposed.

18. The apparatus as set forth in claim 16 wherein the grounding elements are bars.

19. The apparatus as set forth in claim 17 wherein the bars are formed of indium tin oxide (ITO).

20. The apparatus as set forth in claim 17 wherein the base plane is transparent.

21. The apparatus as set forth in claim 16 wherein the ground plane assembly is transparent.

* * * * *